United States Patent
Liu et al.

(10) Patent No.: US 11,716,426 B2
(45) Date of Patent: Aug. 1, 2023

(54) TECHNIQUES FOR IMPLEMENTING PHONE NUMBER-BASED USER ACCOUNTS WITH PERMISSIONS TO ACCESS VARYING LEVELS OF SERVICES UTILIZING VISIBLE AND HIDDEN CONTACT ADDRESSES

(71) Applicant: Apple Inc., Cupertino, CA (US)

(72) Inventors: Xudong Liu, Campbell, CA (US); Guozhi Huang, San Mateo, CA (US); Jonathon Sodos, Los Gatos, CA (US)

(73) Assignee: Apple Inc.

( * ) Notice: Subject to any disclaimer, the term of this patent is extended or adjusted under 35 U.S.C. 154(b) by 229 days.

(21) Appl. No.: 17/017,560

(22) Filed: Sep. 10, 2020

(65) Prior Publication Data

US 2021/0400148 A1  Dec. 23, 2021

Related U.S. Application Data

(60) Provisional application No. 63/041,912, filed on Jun. 21, 2020.

(51) Int. Cl.
*H04M 15/00* (2006.01)
*H04M 3/42* (2006.01)
*H04M 1/27457* (2020.01)

(52) U.S. Cl.
CPC ... *H04M 15/7556* (2013.01); *H04M 1/27457* (2020.01); *H04M 3/42382* (2013.01); *H04M 2203/6081* (2013.01)

(58) Field of Classification Search
CPC ......... H04M 15/7556; H04M 1/27457; H04M 3/42382; H04M 2203/6081
See application file for complete search history.

(56) References Cited

U.S. PATENT DOCUMENTS 10,506,088 B1 * 12/2019 Singh ................ H04M 1/27457
2003/0163706 A1 * 8/2003 Cocchi .................... G06F 21/10
713/193

(Continued)

FOREIGN PATENT DOCUMENTS

| KR | 20150061534 A | 6/2015 |
| KR | 20150100463 A | 9/2015 |
| KR | 20170015038 A | 2/2017 |

OTHER PUBLICATIONS

PCT Patent Application No. PCT/US2021/038243—International Search Report and Written Opinion dated Sep. 17, 2021.

*Primary Examiner* — Pakee Fang
(74) *Attorney, Agent, or Firm* — Dickinson Wright RLLP

(57) ABSTRACT

This application sets forth techniques for managing phone number-based user accounts. According to some embodiments, a server computing device can be configured to carry out the steps of (1) receiving, from a first client computing device, a request to create a user account based on a phone number, (2) in response to authenticating that the first client computing device is associated with the phone number: creating the user account based on the phone number, creating a hidden contact address based on the phone number, and assigning the hidden contact address to the user account, and (3) in response to receiving a notification that a second client computing device is associated with the phone number: requiring the user account to be updated to be based on a different phone number, or assigning, to the user account, a visible contact address based on the phone number.

20 Claims, 10 Drawing Sheets

(56) References Cited

U.S. PATENT DOCUMENTS

| | | |
|---|---|---|
| 2006/0240824 A1 | 10/2006 | Henderson et al. |
| 2008/0304518 A1* | 12/2008 | Cheng .................. H04L 67/53 |
| | | 370/474 |
| 2013/0007900 A1* | 1/2013 | Santhanu ........... G06F 21/6245 |
| | | 726/30 |
| 2014/0254434 A1* | 9/2014 | Jain .................... H04L 65/1094 |
| | | 370/259 |
| 2016/0065553 A1 | 3/2016 | Lim |
| 2016/0286041 A1* | 9/2016 | Forsman .............. H04W 12/43 |
| 2017/0223537 A1 | 8/2017 | Lee et al. |

* cited by examiner

TECHNIQUES FOR IMPLEMENTING PHONE NUMBER-BASED USER ACCOUNTS WITH PERMISSIONS TO ACCESS VARYING LEVELS OF SERVICES UTILIZING VISIBLE AND HIDDEN CONTACT ADDRESSES

CROSS-REFERENCE TO RELATED APPLICATIONS

The present application claims the benefit of U.S. Provisional Application No. 63/041,912, entitled "TECHNIQUES FOR MANAGING PHONE NUMBER-BASED USER ACCOUNTS," filed Jun. 21, 2020, the content of which is incorporated herein by reference in its entirety for all purposes.

FIELD

The described embodiments relate generally to managing phone number-based user accounts. More particularly, the described embodiments involve enabling a user to register for a user account that is based on a phone number of the user. Subsequently, hidden and/or visible contact addresses based on the phone number of the user can be assigned to the user account to enable the user to access varying levels of services.

BACKGROUND

A conventional approach for creating a user account for a service involves prompting a user to provide an alphanumeric username and a password. Oftentimes, the user's desired alphanumeric username is unavailable or invalid, such that the user is forced to provide alternative alphanumeric usernames until one is available and valid. As a result, and over time, the user must recall varying usernames for the different services with which the user is registered, which can be frustrating and difficult for the user to effectively manage. For example, it may be necessary for the user to frequently utilize a "Forgot User ID" hyperlink that kicks off a cumbersome process of verifying credentials merely to indicate to the user the forgotten alphanumeric username.

Notably, some services have, at least in part, alleviated this issue by enabling users to instead register for user accounts using their email addresses. Typically, a given service requires a given user to prove possession of the email address prior to creating a user account based on the email address, e.g., by emailing the user with a verification hyperlink, or by requiring the user to input a code that is provided in an email sent to the email address. This approach is beneficial in that users are almost guaranteed to be unencumbered with availability/validation issues when attempting to register for user accounts using their email addresses.

Importantly, while email-based usernames have improved some of the issues associated with alphanumeric-based usernames, such email-based usernames do not provide any relief for individuals who are seeking to create user accounts based on their phone number. This deficiency is common because many users do not have email addresses, whereas virtually all users have a phone number. As a result, such users are required to register for an email address that they have no interest in utilizing.

Accordingly, what is needed is an improved user account creation approach that alleviates the above-described issues associated with alphanumeric-based and email-based usernames.

SUMMARY

The representative embodiments set forth herein disclose various techniques for enabling a user to register for a user account that is based on a phone number of the user.

One embodiment sets forth a method for managing phone number-based user accounts. According to some embodiments, the method can be implemented at a server computing device, and include the steps of (1) receiving, from a first client computing device, a request to create a user account based on a phone number, (2) in response to authenticating that the first client computing device is associated with the phone number: creating the user account based on the phone number, creating a hidden contact address based on the phone number, and assigning the hidden contact address to the user account, and (3) in response to receiving a notification that a second client computing device is associated with the phone number: requiring the user account to be updated to be based on a different phone number, or assigning, to the user account, a visible contact address based on the phone number.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Figure 1:
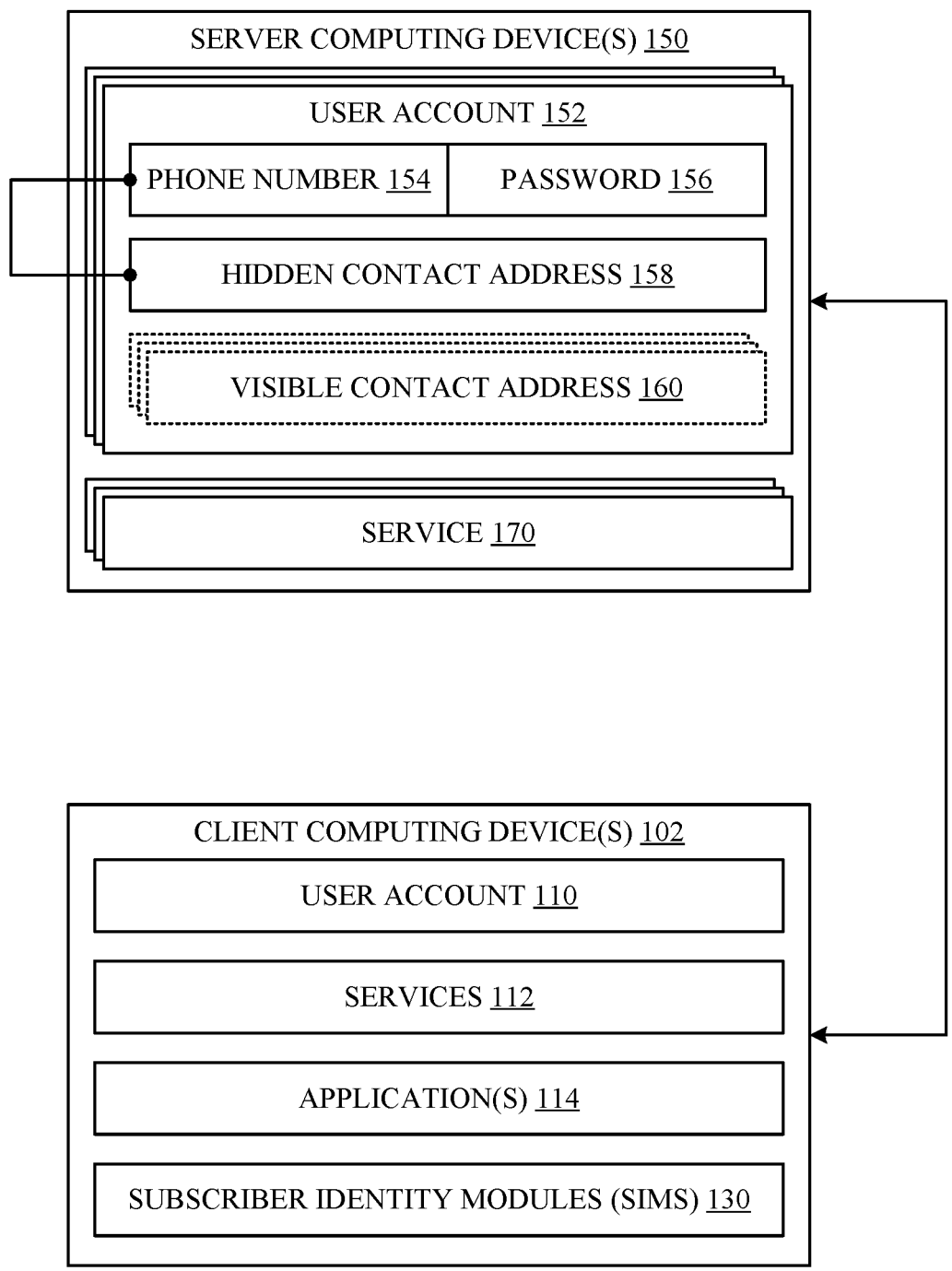
FIG. 1 illustrates a block diagram of different computing devices that can be configured to implement different aspects of the various techniques described herein, according to some embodiments.

FIG. 1 illustrates a block diagram 100 of one or more server computing devices 150 that can be configured to implement various aspects of the techniques described herein. According to some embodiments, each server computing device 150 can represent any form of computing device, e.g., a smartphone, a tablet, a wearable, a desktop computing device, a rack-mounted computing device, and so on. It is noted that the foregoing examples are not meant to be limiting. On the contrary, each server computing device 150 can represent any form of computing device without departing from the scope of this disclosure. Although not explicitly illustrated in FIG. 1, a given server computing device 150 can include at least one processor, at least one memory, and at least one storage device that can operate in conjunction to enable the server computing device 150 to implement the various techniques set forth in this disclosure.

According to some embodiments, and as shown in FIG. 1, the server computing device 150 can be configured to manage a collection of user accounts 152, where each user account 152 can include a phone number 154. According to some embodiments, the phone number 154 of a given user account 152 represents a username property for the user account 152 and is based on a phone number of the user. For example, the phone number 154 can represent a string value that stores a text representation of the user's phone number (e.g., "111-222-3333"). Alternatively, the phone number 154 can represent a numerical value that stores a numerical representation of the user's phone number (e.g., 111222333). It is noted that the foregoing examples are not meant to be limiting, and that any approach can be used to store the user's phone number without departing from the scope of this disclosure. Additionally, each user account 152 can include a password 156, which represents any type of value (e.g., string, number, etc.) for storing the user's password for the user account 152.

As shown in FIG. 1, each user account 152 can include a hidden contact address 158 that is based on the phone number 154. Establishing a hidden contact address 158 for a given user account 152 places the user account 152 into an "unexposed" state that enables any client computing devices 102 logged-in with the user account 152 to participate in a subset of services 170 that are implemented by or accessible to the server computing device 150. According to some embodiments, the subset of services 170 can omit any service 170 within the services 170 for which there is an external alternative that commonly utilizes phone numbers as a basis for addressing/routing communications. The subset of services 170 can include, for example, cloud storage services, photo sharing services, location services, and so on. Conversely, the subset of services can omit, for example, audio and/or video services, messaging services, and so on.

According to some embodiments, each user account 152 can also include a visible contact address 160 that can be based on the phone number 154—or be based on another form of contact associated with the user, e.g., another phone number owned by the user, an email address belonging to the user, and so on. According to some embodiments, establishing a visible contact address 160 for a given user account 152 places the user account 152 into an "exposed" state that enables any client computing devices 102 logged-in with the user account 152 to obtain a higher level of access to the services 170 in comparison to the subset of services 170 (described above) accessible to the hidden contact address 158. The additional services 170 can include, for example, services 170 for which there is an external alternative that commonly utilizes phone numbers as a basis for addressing/routing communications, e.g., audio and/or video services, messaging services, and so on.

It is noted that a more detailed explanation of hidden and visible contact addresses, and the manner in which they affect the services 170 available to the user account 152, is described below in greater detail in conjunction with FIGS. 2A-2D and 3A-3B.

According to some embodiments, the server computing device 150 can be configured to communicate with one or more client computing devices 102. Each client computing device 102 can represent any form of computing device, e.g., a smartphone, a tablet, a wearable, a desktop computing device, a rack-mounted computing device, and so on. It is noted that the foregoing examples are not meant to be limiting, and that each client computing device 102 can represent any form of computing device without departing from the scope of this disclosure. Again, and although not explicitly illustrated in FIG. 1, it should be understood that client computing device 102 can include at least one processor, at least one memory, and at least one storage device to enable the client computing device 102 to interface with the server computing device(s) 150 so that the various techniques set forth in this disclosure can be implemented.

As shown in FIG. 1, each client computing device 102 can manage a user account 110 that corresponds to one of the user accounts 152 managed by the server computing devices 150. The user account 110 can be established on a client computing device 102 by performing a new user account 152 registration process, or by providing credentials for an existing user account 152. A new user account 152 registration process can involve, for example, one or more server computing devices 150 creating a user account 152 for the user, as well as the client computing device 102 establishing a user account 110 that corresponds to the newly-created user account 152. Alternatively, the existing user account 152 login process can involve, for example, the user providing login credentials—e.g., a phone number 154 and a password 156 for an existing user account 152—to a server computing device 150. When the login credentials are validated, the client computing device 102 can establish a user account 110 that corresponds to the existing user account 152. It is noted that a more detailed explanation of the user account creation/login processes is described below in greater detail in conjunction with FIGS. 2A-2D and 3A-3B.

Additionally, and as illustrated in FIG. 1, each client computing device 102 can be configured to implement services 112 that are configured to interface with the services 170 provided by the server computing devices 150. For example, the services 112 can represent client-side implementations (e.g., applications, daemons, etc.) that correspond to server-side implementations and enable users of the client computing devices 102 to access the services 170. Each client computing device 102 can also be configured to locally-execute one or more applications 114, e.g., photo applications, mail applications, contacts applications, and the like.

Additionally, each client computing device 102 can include one or more Subscriber Identity Modules (SIMs) 130. According to some embodiments, one or more of the SIMs 130 can represent a physical/removable SIM card (e.g., a 2FF, 3FF, 4FF, etc. SIM card) that is inserted into a respective receiving bay included in the client computing device 102. Additionally, one or more of the SIMs 130 can represent an electronic Universal Integrated Circuit Card (eUICC) capable of managing one or more electronic (i.e., virtual/non-physical) Subscriber Identity Modules (eSIMs). In any case, each SIM 130 typically is associated with a phone number that enables the client computing device 102 to access wireless services provided by a respective Mobile Network Operator (MNO) with which the SIM 130 is associated. According to some embodiments, and as described in greater detail herein, the SIMs 130 can enable users to prove that they have both initial and continuing ownership over phone numbers that are tied to the user accounts 152.

Accordingly, FIG. 1 sets forth a high-level overview of the different hardware/software architectures that can be implemented by the server computing device 150 and the client computing device 102 to implement the various techniques described herein. It is noted that the embodiments described herein are not limited to a single server computing device 150 and client computing device 102 interacting with one another. On the contrary, any number of server computing devices 150 can be configured to implement, in whole or in part, the techniques set forth herein, and can be configured to communicate with any number of client computing devices 102. Additionally, it is noted that the services 170 described herein can be implemented by the server computing devices 150 (in whole or in part) or by other computing devices not illustrated in FIG. 1 that are configured to implement one or more of the services 170 (in whole or in part) or other services not illustrated in FIG. 1. Next, FIGS. 2A-2D, 3A-3B, and 4-6—which are described in greater detail below—set forth example conceptual and method diagrams in which the server computing device 150 can manage phone number-based user accounts in accordance with the techniques set forth herein.

FIGS. 2A-2D illustrate conceptual diagrams for establishing a user account 152 by way of a client computing device 102, according to some embodiments. It is noted that the user interfaces provided in FIGS. 2A-2D are not meant to be limiting in any way, and that any form of user interface—as well as any procedure—can be implemented to achieve the techniques set forth herein without departing from the scope of this disclosure.

Figure 2A:
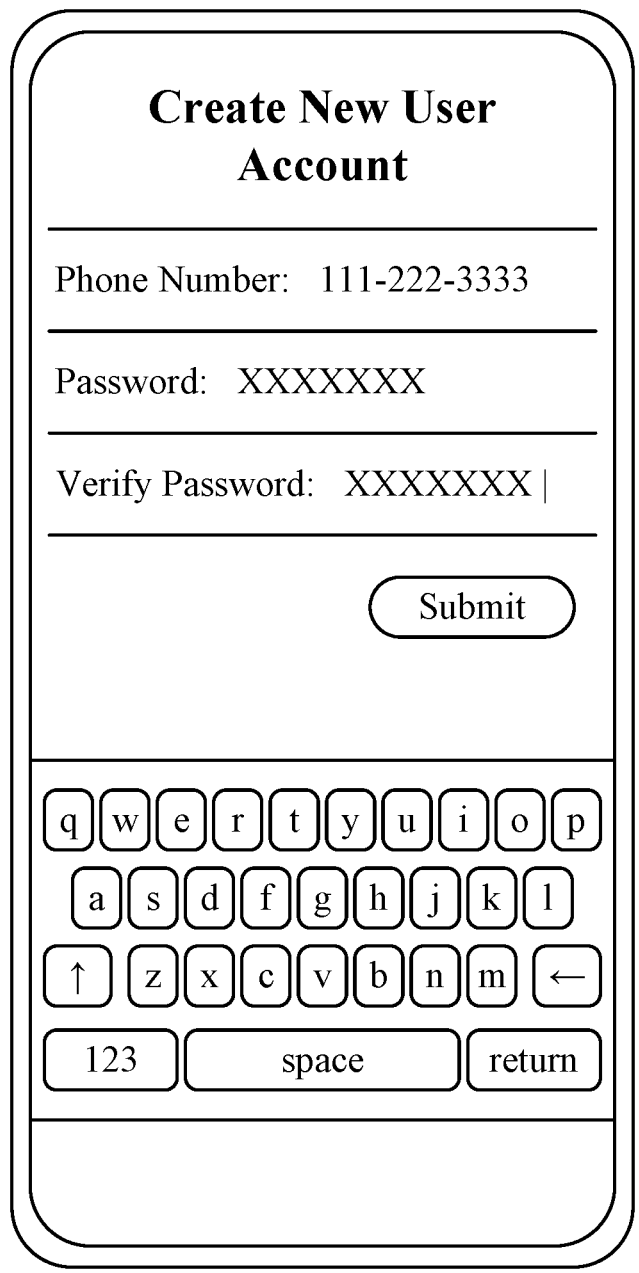
FIGS. 2A-2D illustrate conceptual diagrams for establishing a user account at a client computing device, according to some embodiments.

FIG. 2A illustrates a conceptual diagram 200 of a first user interface for creating a new user account 152 with the server computing device 150. As shown in FIG. 2A, the first user interface can enable a phone number to be input and used a basis for establishing the new user account 152, such as "111-222-3333". According to some embodiments, the phone number field can be automatically populated to include the phone number, e.g., by detecting SIM 130 information that is accessible to the client computing device 102. As also shown in FIG. 2A, the first user interface can also enable a desired password for the new user account 152 to be input and verified. After the information is entered, the "Submit" button can be selected to transmit the phone number/password information to the server computing device 150.

Figure 2B:
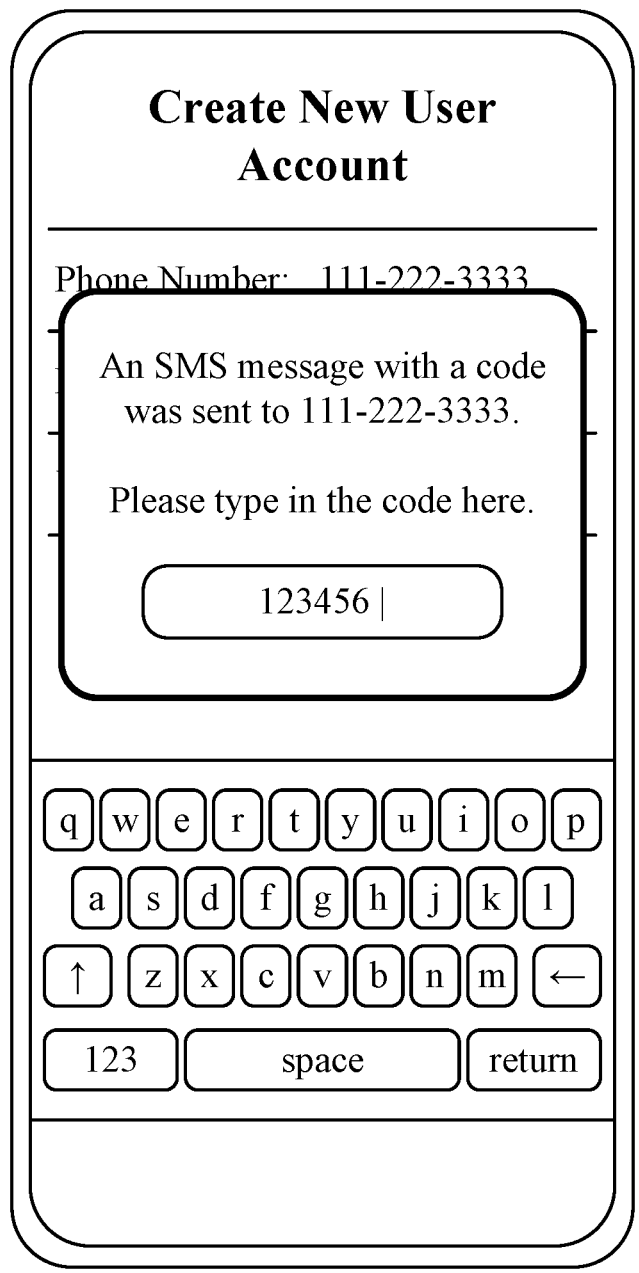

FIG. 2B illustrates a conceptual diagram 210 of a second user interface for verifying that the phone number provided by the client computing device 102 is one of which the client computing device 102 is currently in possession. This can involve, for example, the server computing device 150 transmitting a temporary code to the phone number, where proof of receipt functions as proof that the phone number is accessible to the client computing device 102. Various techniques can be used to authenticate the phone number without departing from the scope of this disclosure, including the code and inquiry-based techniques described in greater detail below in conjunction with FIGS. 4-5.

Figure 2C:
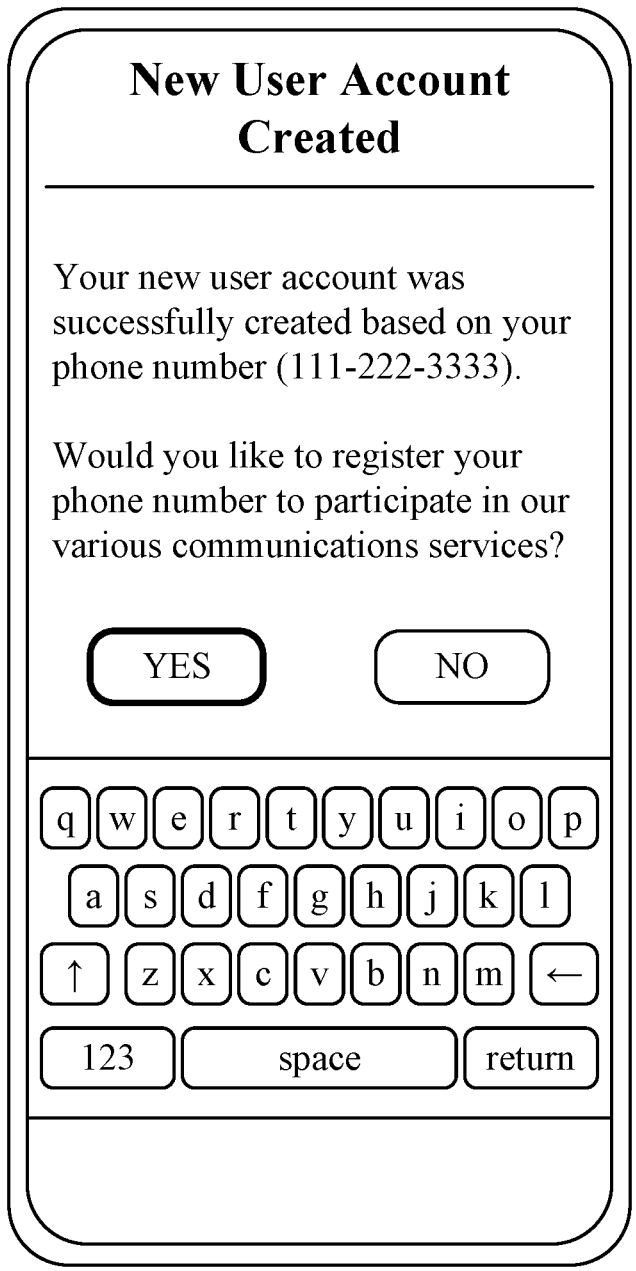
Figure 2D:
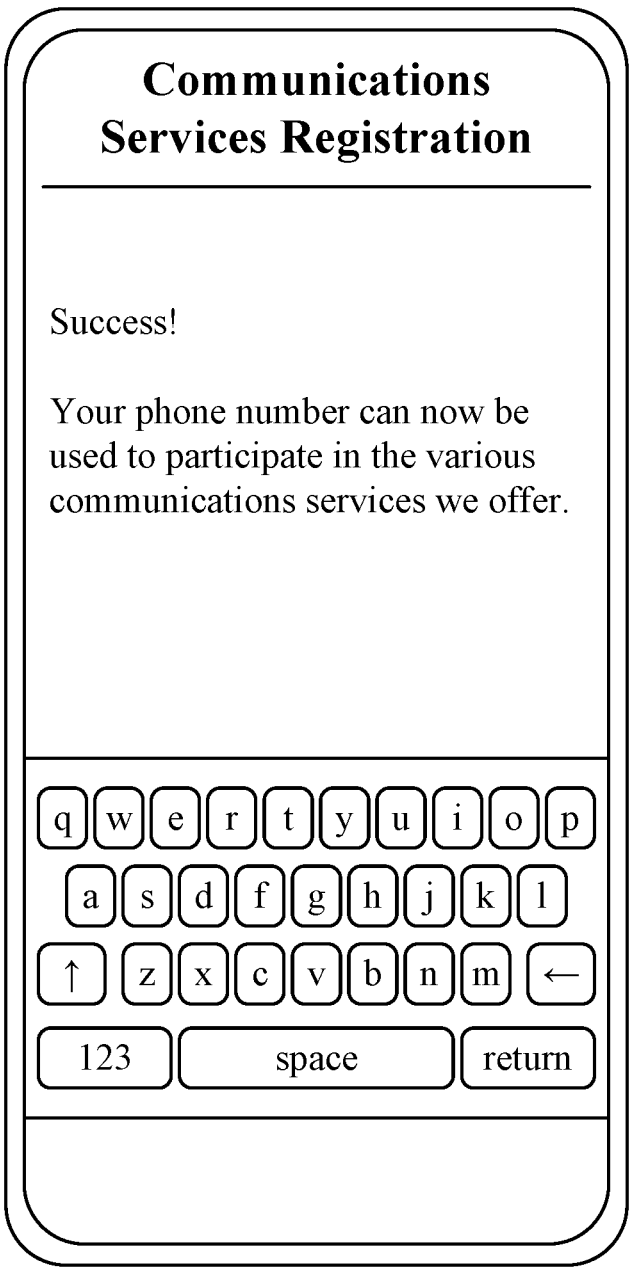

FIG. 2C illustrates a conceptual diagram 220 of a third user interface that displays a confirmation of the creation of the new user account 152. The confirmation can follow the creation of the new user account 152, where the phone number "111-222-3333" is assigned to the phone number 154 of the new user account 152, the password is assigned to the password 156 of the new user account 152, and the phone number "111-222-3333" is assigned to the hidden contact address 158 of the new user account 152. As described herein, the new user account 152, at this juncture, is in an "unexposed" state that enables the client computing device 102 to participate in a subset of services that are implemented by or accessible to the services 170. Again, the subset of services 170 can omit services for which there is an external alternative that commonly utilizes phone numbers as a basis for addressing/routing communications (e.g., audio and/or video services, messaging services, etc.).

According to some embodiments, the new user account 152—despite being in an unexposed state—can be permitted to access the omitted services 170 in a limited manner when one or more conditions are satisfied. In particular, the new user account 152 can be permitted to transmit communications over the audio and/or video services, messaging services, and/or other services so long as the communications are addressed to other user accounts 152 with which the new user account 152 is authorized to communicate. Such authorized user accounts 152 can include, for example, a family group of user accounts 152 of which the new user account 152 and at least one other user account 152 are members. This approach can enable, for example, parents and children to communicate with one another using their respective phone numbers 154 while preventing the children from receiving communications from other user accounts 152 (via their respective phone numbers 154) that do not belong to the group.

It is noted that groups of user accounts 152 are not limited to family groups, and that any group of user accounts 152 can be established without departing from the scope of this disclosure. For example, a group of user accounts 152 can be established for a business to enable the user accounts 152 to communicate between one another using their respective phone numbers 154 while preventing the user accounts 152 from communicating with other user accounts 152 (via their respective phone numbers 154) that do not belong to the group.

Returning now to FIG. 2C, it is noted that in many cases, the user may desire to utilize the phone number to participate in the omitted services 170. Accordingly, the third user interface also enables the new user account 152 to transition to an "exposed" state that enables the client computing device 102 to participate in such omitted services 170. In FIG. 2C, a hypothetical user selects "YES" to this prompt, which causes the server computing device 150 to create a visible contact address 160 based on the phone number and associate the visible contact address 160 with the new user account 152. A confirmation of success of this procedure is illustrated in the conceptual diagram 230 of a fourth user interface of FIG. 2D that displays a confirmation of transitioning the user account 152 to the "exposed" state.

Additionally, it is noted that the client computing device 102 can take appropriate action to create/manage a counterpart user account 110 that complements the user account 152 managed by the server computing device 150 as the user account 152 creation/management processes are executed. For example, FIG. 2C can involve the client computing device 102 creating the counterpart user account 110 in an "unexposed" state, and FIG. 2D can involve the client computing device 102 updating the counterpart user account 110 to indicate that it is in an "exposed" state. This update can enable, for example, other user interfaces for registering with and participating in services 170 that are available only to "exposed" user accounts.

Figure 3A:
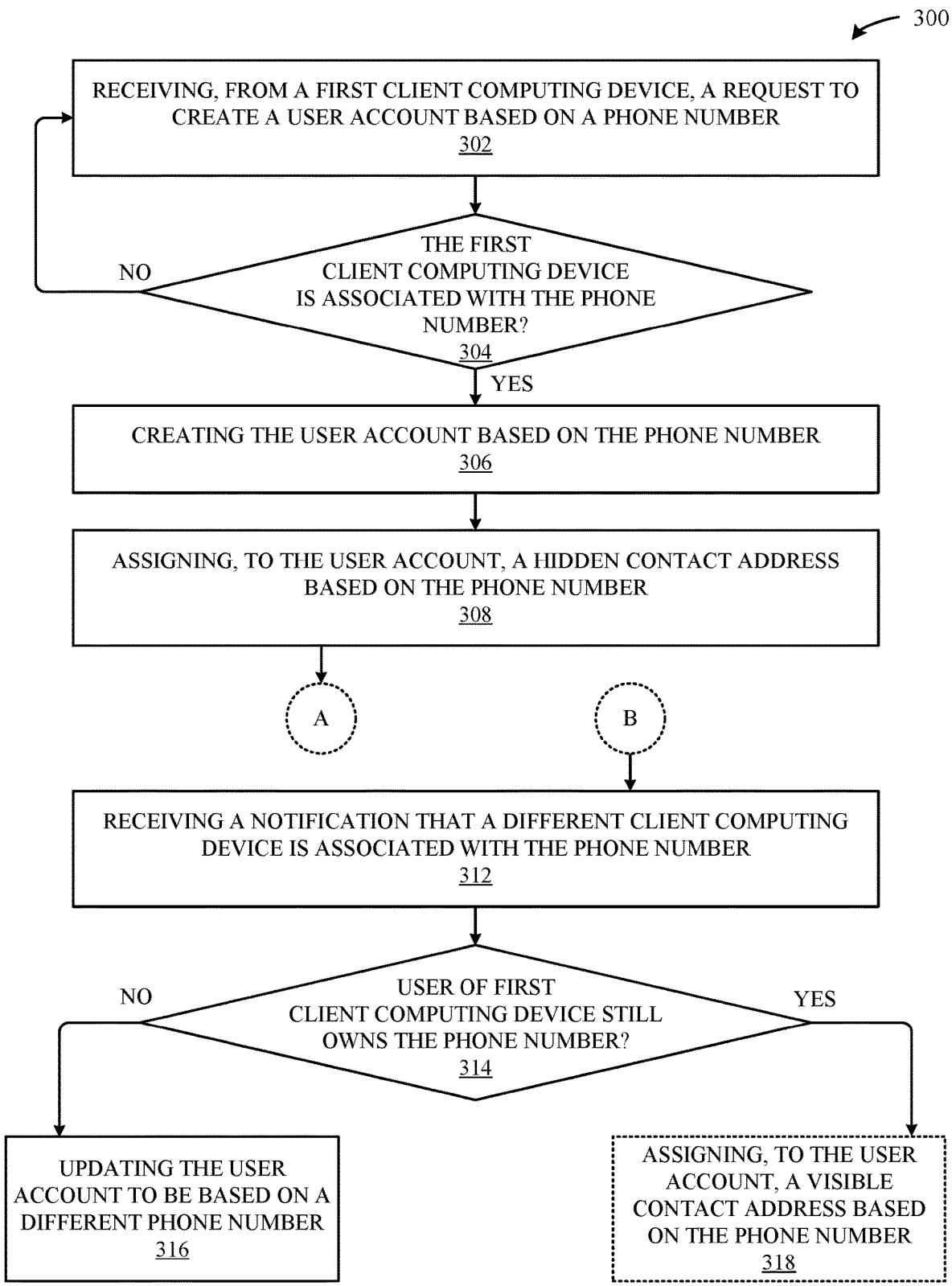
FIGS. 3A-3B illustrate a method for creating and managing phone number-based user accounts, according to some embodiments.
Figure 3B:
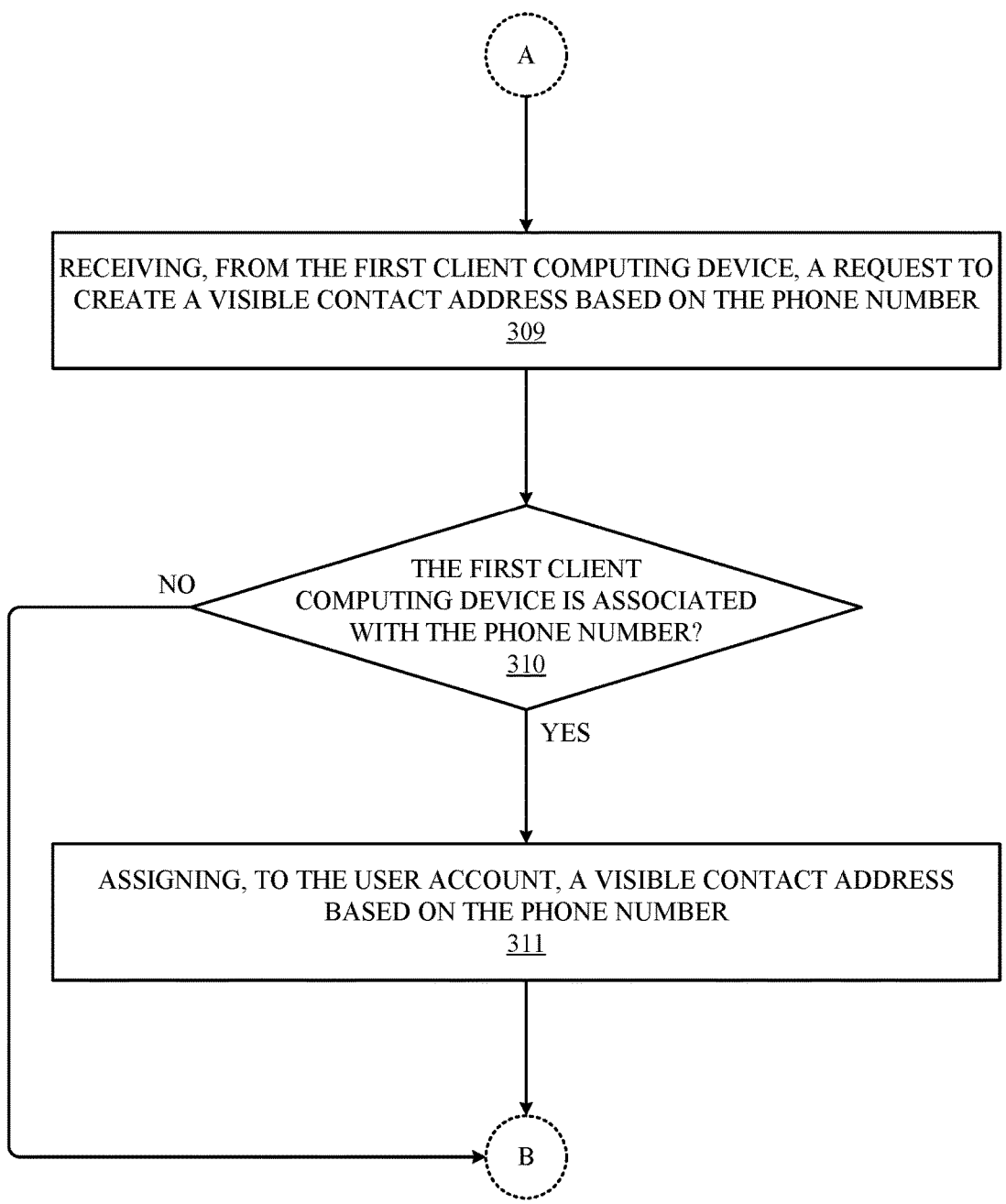

FIGS. 3A-3B illustrate a method 300 for creating and managing phone number-based user accounts, according to some embodiments. As shown in FIG. 3A, the method 300 begins at step 302, where the server computing device 150 receives, from a first client computing device 102, a request to create a user account 152 based on a phone number. According to some embodiments, the request can be provided by the first client computing device 102 in response to a user of the first client computing device 102 seeking access to one or more of the services 170. For example, the user of the first client computing device 102 may desire to enable data stored on the first client computing device 102 to be backed up to cloud storage included in the services 170. In another example, the user of the first client computing device 102 may desire to enable the first client computing device 102 to receive communications (e.g., video, audio, text, etc.) provided by a communications platform included in the services 170. In yet another example, the user of the first client computing device 102 may desire to enable the first client computing device 102 to share photos with friends and family via a photo sharing service that is implemented by or accessible to the services 170.

At step 304, the server computing device 150 determines whether the first client computing device 102 is associated with the phone number. According to some embodiments, the server computing device 150 and the first client computing device 102 can engage in communications that effectively enable the server computing device 150 to verify that the phone number is accessible to the first client computing device 102 (and presumably owned by the user). A more detailed explanation of techniques that can be used to make such a determination are provided below in conjunction with FIGS. 4-5. If, at step 304, the server computing device 150 determines that the client computing device is associated with the phone number, then the method 300 proceeds to step 306. Otherwise, the method 300 can restart at step 302 or terminate altogether.

At step 306, the server computing device 150 creates the user account 152 based on the phone number. According to some embodiments, creating the user account 152 can involve assigning the phone number to the phone number 154 of the user account 152. Creating the user account 152 can also involve assigning a password—e.g., one provided by the user, one generated by the first client computing device 102, etc.—to the password 156 of the user account 152.

At step 308, the server computing device 150 assigns, to the user account 152, a hidden contact address 158 based on the phone number. According to some embodiments, the execution of step 308 places the user account 152 into an "unexposed" state that enables the first client computing device 102 to participate in a subset of services 170. According to some embodiments, and as previously described herein, the subset of services can omit any service 170 within the services 170 for which there is an external alternative that commonly utilizes phone numbers as a basis for addressing/routing communications. Consider, for example, a messaging service implemented by the services 170, where the messaging service enables users to message one another using their phone numbers. This messaging service is akin to the Short Message Service (SMS)/Multimedia Messaging Service (MIMS) implemented by Mobile Network Operators (MNOs) in that they also enable users to message one another using their phone numbers. Also consider, for example, a voice communications service (e.g., a Voice over Internet Protocol) implemented by the services 170, where the voice communications service enables users to conduct audio/video phone calls using their phone numbers. This voice communications service is akin to what is commonly offered by MNOs to its subscribers by utilizing their respective phone numbers.

Turning now to FIG. 3B, at optional step 309, the server computing device 150 receives, from the first client computing device 102, a request to create a visible contact address 160 based on the phone number, to effectively transition the user account 152 from an "unexposed" state to an "exposed" state. According to some embodiments, the request can be generated in conjunction with the first client computing device 102 seeking to access services 170 not included in the subset of services described above in conjunction with step 308 of FIG. 3A (e.g., services 170 for which there is an external alternative that commonly utilizes phone numbers as a basis for addressing/routing communications, e.g., audio and/or video services, messaging services, and so on).

At optional step 310, the server computing device 150 determines whether the first client computing device 102 is associated with the phone number. It can be necessary to re-perform this determination because the first client computing device 102 may issue the request despite no longer having ownership over the phone number. Consider, for example, a scenario in which a user account 152 is created using the phone number that is associated with the first client computing device 102 (e.g., as described above in conjunction with steps 302-306 of FIG. 3A). Subsequently, the first client computing device 102 is associated with a new phone number—e.g., a swap to a new SIM card, a provision of a new eSIM, etc.—but the user account 152 remains assigned to the phone number. In this scenario, when an attempt is made to assign a visible contact address 160 to the user account 152 based on the phone number, the attempt should be denied, as it is not appropriate to direct communications—specifically, communications over services 170 for which there is an external alternative—to the first client computing device 102 given it is no longer associated with the phone number.

Accordingly, if, at step 310, the server computing device 150 determines that the first client computing device 102 is associated with the phone number, then the method 300 proceeds to step 311, where the server computing device 150 assigns, to the user account 152, a visible contact address 160 based on the phone number. Otherwise, the server computing device 150 denies the request, and the method 300 proceeds to step 312 of FIG. 3A.

At step 312 of FIG. 3A, the server computing device 150 receives a notification that a second client computing device 102 (i.e., one different from the first client computing device 102 described above in conjunction with FIGS. 3A-3B) is associated with the phone number. More specifically, the notification indicates that the phone number is now accessible to—and presumably owned by the user of—the second client computing device 102. This can occur, for example, when the second client computing device 102 is in possession of a SIM card assigned to the phone number, when the second client computing device 102 is provisioned with an eSIM that is assigned to the phone number, and so on. In any case, this notification represents a conflict that the server computing device 150 should seek to resolve.

At step 314, the server computing device 150 determines whether the user associated with the first client computing device 102 still owns the phone number. In one example, the first client computing device 102 and the second client computing device 102 may be owned by the same user, where the user simply swapped a physical SIM card (associated with the phone number) from the first client computing device 102 to the second client computing device 102, or where an eSIM (associated with the phone number) was re-provisioned from the first client computing device 102 to the second client computing device 102. This typically occurs when a user is upgrading to the second client computing device 102 while retaining ownership of the first client computing device 102. In an alternative example, the first and second client computing devices 102 are respectively-owned by different users, and the second client computing device 102 has been assigned the phone number that at one point was assigned to the first client computing device 102. This can occur, for example, when the phone number is disassociated from the first client computing device 102, is returned to a pool of available phone numbers, and is subsequently assigned to the second client computing device 102.

In any case, at step 314, the server computing device 150 determines whether the user of the first client computing device 102 still owns the phone number. Again, a more detailed explanation of techniques that can be used to make such a determination are provided below in conjunction with FIGS. 4-5. If, at step 314, the server computing device 150 determines that the user of the first client computing device 102 no longer owns the phone number, then the method proceeds to step 316.

At step 316, the server computing device 150 updates the user account 152 to be based on a different phone number. According to some embodiments, step 316 can involve the server computing device 150 eliminating any visible contact addresses 160 of the user account 152, and subsequently re-performing steps 302-311 described above in conjunction with FIGS. 3A-3B to effectively assign the different phone number to the user account 152. This can also involve causing the first client computing device 102—and any other client computing devices 102 logged in with the user account 152—to update the user accounts 110 that correspond to the user account 152 such that the user accounts 110 are effectively assigned to the different phone number.

Alternatively, if, at step 314, the server computing device 150 determines that the user of the first client computing device 102 does still own the phone number—i.e., the user owns at least one client computing device 102 that is assigned to the phone number—then the method 300 proceeds to optional step 318. At optional step 318, the server computing device 150 assigns, to the user account 152, a visible contact address 160 that is based on the phone number. Such a configuration can be useful to the user in that the first client computing device 102 can be capable of participating in the services 170 normally not accessible to "unexposed" user accounts 152—specifically, communications over platforms for which there is an external alternative—using the phone number originally assigned to the first client computing device 102, notwithstanding the fact that the first client computing device 102 is no longer in possession of a SIM or an eSIM that is associated with the phone number. For example, the user can, using the above-described services 170, receive voice/video phone calls, as well as text messages, addressed to the phone number at both the first and second client computing devices 102.

Figure 4:
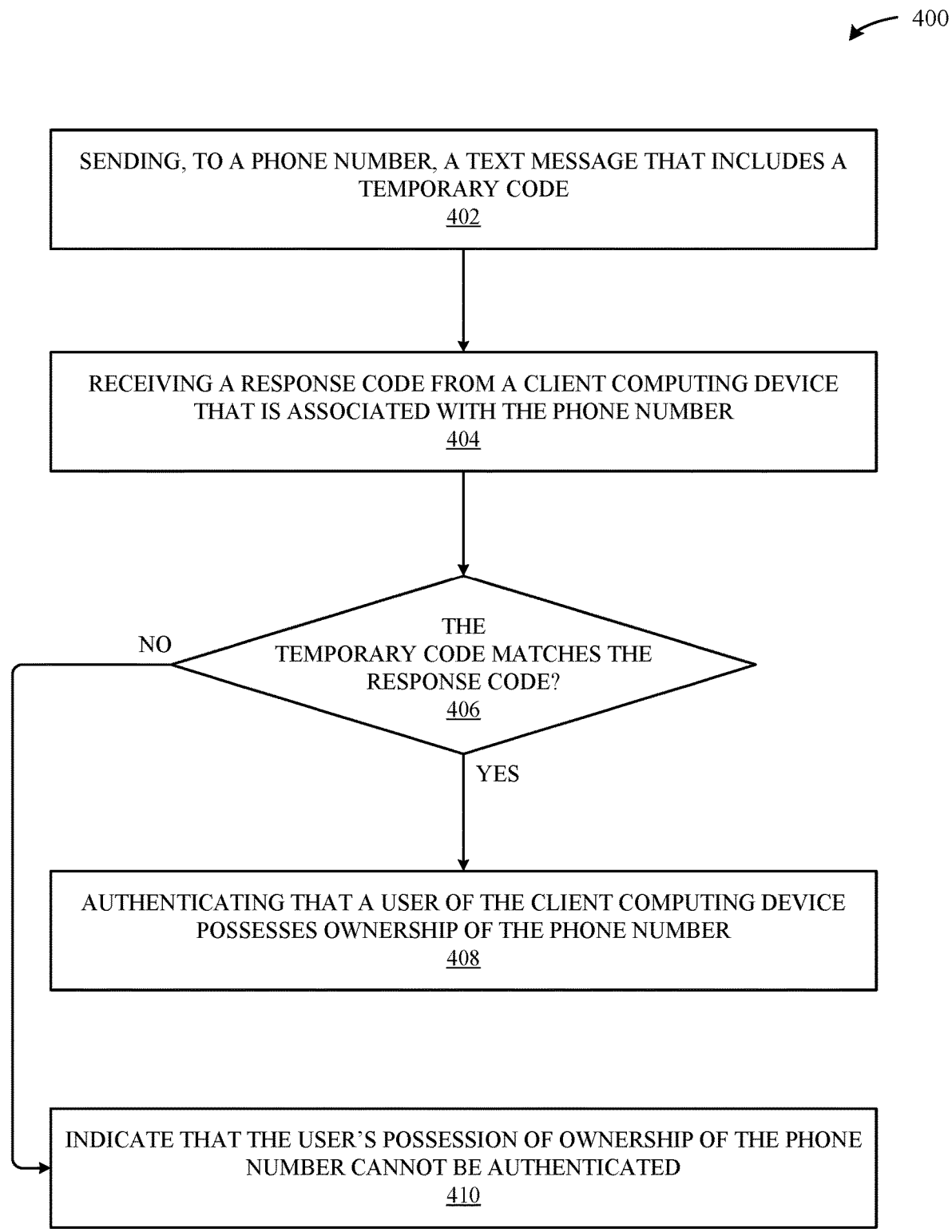
FIG. 4 illustrates a method for a code-based technique to determine whether a user is in possession of a Subscriber Identity Module (SIM) that is associated with a phone number, according to some embodiments.

FIG. 4 illustrates a method 400 for a code-based technique to determine whether a user is in possession of a SIM that is associated with a phone number, according to some embodiments. As shown in FIG. 4, the method 400 begins at step 402, where the server computing device 150 sends, to the phone number, an SMS message (e.g., a text message) that includes a temporary code. According to some embodiments, the client computing device 102 that includes the SIM can receive the text message via a Short Message Service (SMS) provided by a Mobile Network Operator (MNO) associated with the SIM.

At step 404, the server computing device 150 receives a response code from the client computing device 102 that is associated with the phone number. According to some embodiments, the response code can be input by the user of the client computing device 102 into a prompt issued by a server computing device 150, e.g., in association with the verification step 304 described above in conjunction with FIG. 3A. Alternatively, the client computing device 102 can automatically identify the temporary code within the text message and provide it to the server computing device 150 to streamline the verification process.

At step 406, the server computing device 150 determines whether the temporary code matches the response code. If, at step 406, the server computing device 150 determines that the temporary code matches the response code, then the method 400 proceeds to step 408, where the server computing device 150 authenticates that a user of the client computing device 102 possesses ownership of the phone number. Otherwise, the method 400 proceeds to step 410, where the server computing device 150 indicates that the user's possession of ownership of the phone number cannot be authenticated. This can involve, for example, causing the client computing device 102 to display a message indicating the authentication failure. According to some embodiments, the client computing device 102 can be permitted to re-attempt the authentication a threshold number of times, which can involve re-providing the temporary code or attempting to verify one or more updated temporary codes (by re-performing steps 402-406 described above).

Figure 5:
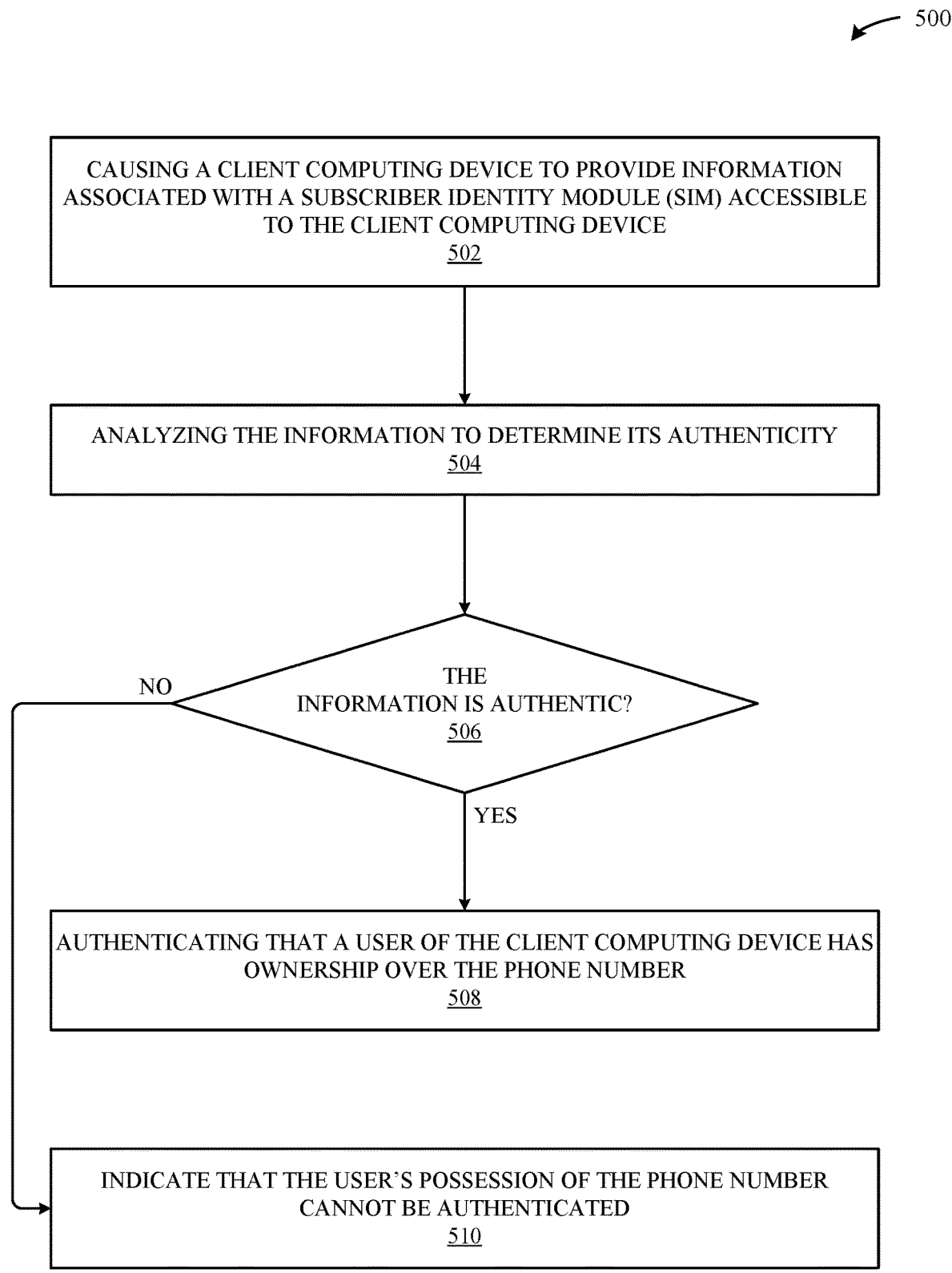
FIG. 5 illustrates a method for an inquiry-based technique to determine whether a user is in possession of a SIM that is associated with a phone number, according to some embodiments.

FIG. 5 illustrates a method 500 for an inquiry-based technique to determine whether a user is in possession of a SIM that is associated with a phone number, according to some embodiments. As shown in FIG. 5, the method 500 begins at step 502, where the server computing device 150 causes a client computing device 102 to provide information associated with a Subscriber Identity Module (SIM) accessible to the client computing device 102, e.g., a particular SIM 130 accessible to the client computing device 102. According to some embodiments, the client computing device 102 can query the SIM 130 for credentials that prove the client computing device 102 is in possession of the SIM 130. For example, the SIM 130 can be associated with a public/private key pair, where the public key is known to the server computing device 150 (e.g., by way of a certificate authority), but the private key is known only to the SIM 130. In this example, the server computing device 150 can cause the client computing device 102/SIM 130 to respond to a random value challenge, which can involve encrypting the random value using the private key to produce an encrypted random value.

At step 504, the server computing device 150 analyzes the information to determine its authenticity. Continuing with the foregoing example, step 504 can involve the server computing device 150 utilizing the public key to decrypt the encrypted random value to produce—and subsequently verify—a decrypted random value.

At step 506, the server computing device 150 determines whether the information is authentic. Continuing with the foregoing example, step 506 can involve the server computing device 150 verifying that the decrypted random value matches the random value that was originally provided with the challenge. If, at step 506, the server computing device 150 determines that the information is authentic, then the method 500 proceeds to step 508, where the server computing device 150 authenticates that a user of the client computing device has ownership over the phone number. Otherwise, at step 510, the server computing device 150 indicates that the user's possession of the phone number cannot be authenticated. This can involve, for example, causing the client computing device 102 to display a message indicating the authentication failure. According to some embodiments, the client computing device 102 can be permitted to re-attempt the authentication a threshold number of times, which can involve re-attempting challenges (by re-performing steps 502-506 described above).

It is noted that the authentication techniques described above in conjunction with FIGS. 4-5 are not mutually exclusive, and that any combination of these techniques can be employed to authenticate ownership of a phone number without departing from the scope of this disclosure.

Figure 6:
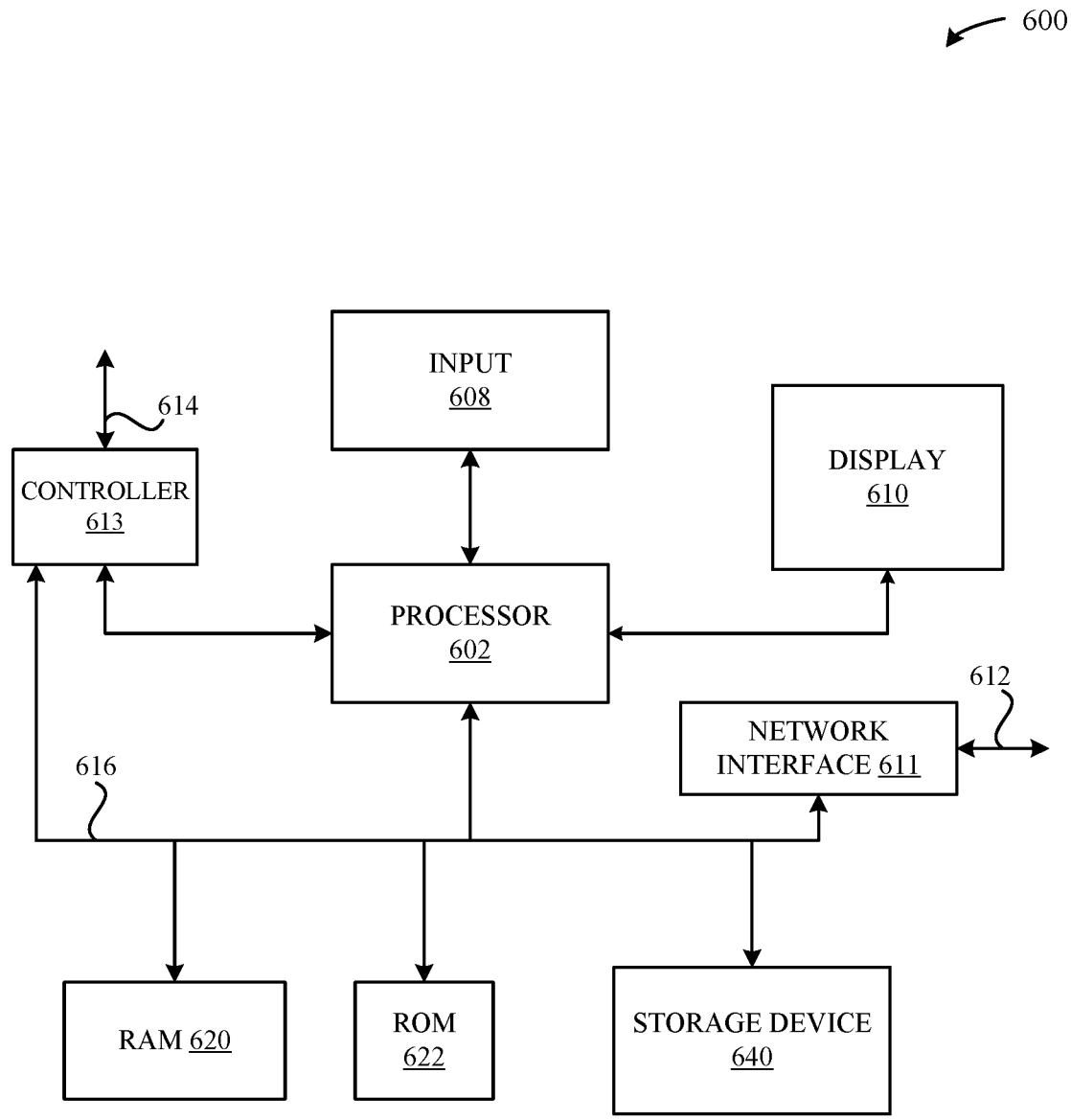
FIG. 6 illustrates a detailed view of a computing device that can be configured to implement the various techniques described herein, according to some embodiments.

FIG. 6 illustrates a detailed view of a computing device 600 that can represent the different computing devices of FIG. 1 used to implement the various techniques described herein, according to some embodiments. For example, the detailed view illustrates various components that can be included in the client computing devices 102 and server computing devices 150 described above in conjunction with FIG. 1. As illustrated in FIG. 6, the computing device 600 can include at least one processor 602 that represents a microprocessor or controller for controlling the overall operation of the computing device 600. The computing device 600 can also include a user input device 608 that allows a user of the computing device 600 to interact with the computing device 600. For example, the user input device 608 can take a variety of forms, such as a button, keypad, dial, touch screen, audio input interface, visual/image capture input interface, input in the form of sensor data, and so on. Still further, the computing device 600 can include a display 610 that can be controlled by the at least one processor 602 (e.g., via a graphics component) to display information to the user. A data bus 616 can facilitate data transfer between at least one storage device 640, the at least one processor 602, and a controller 613. The controller 613 can be used to interface with and control different equipment through an equipment control bus 614. The computing device 600 can also include a network/bus interface 611 that couples to a data link 612. In the case of a wireless connection, the network/bus interface 611 can include a wireless transceiver.

As noted above, the computing device 600 also includes the at least one storage device 640, which can comprise a single disk or a collection of disks (e.g., hard drives). In some embodiments, the at least one storage device 640 can include flash memory, semiconductor (solid state) memory or the like. The computing device 600 can also include at least one Random-Access Memory (RAM) 620 and at least one Read-Only Memory (ROM) 622. The at least one ROM 622 can store programs, utilities, or processes to be executed in a non-volatile manner. The at least one RAM 620 can provide volatile data storage and can store instructions related to the operation of applications executing on the computing device 600.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for managing phone number-based user accounts, the method comprising, at a server computing device:
   receiving, from a first client computing device, a request to create a user account based on a phone number;
   authenticating that the first client computing device is associated with the phone number;
   creating the user account based on the phone number;
   creating a hidden contact address based on the phone number, wherein the hidden contact address permits the first client computing device to access only a subset of services that otherwise are accessible using a counterpart visible contact address that is based on the phone number;
   assigning the hidden contact address to the user account; and
   in response to receiving a notification that a second client computing device is associated with the phone number:
   requiring the user account to be updated to be based on a different phone number, or assigning, to the user account, the counterpart visible contact address.

2. The method of claim 1, wherein requiring the user account to be based on the different phone number comprises:
   disassociating the phone number from the user account;
   associating the different phone number with the user account;
   creating a second hidden contact address based on the different phone number; and
   assigning the second hidden contact address to the user account.

3. The method of claim 1, wherein assigning the user account to the counterpart visible contact address comprises:
   creating the counterpart visible contact address based on the phone number; and
   assigning the counterpart visible contact address to the user account.

4. The method of claim 1, wherein the subset of services:
   includes client computing device recovery services and/or cloud sharing services, and excludes both messaging-based communication services and audio/video-based communication services.

5. The method of claim 1, wherein the counterpart visible contact address enables the first client computing device to access services that include one or more of:
   client computing device recovery services,
   cloud sharing services,
   messaging-based communication services, or
   audio/video-based communication services.

6. The method of claim 1, wherein authenticating that the first client computing device is tied to the phone number comprises:
   receiving, from the first client computing device, a first verification that a Subscriber Identity Module (SIM) accessible to the first client computing device is associated with the phone number; and/or
   receiving, from the first client computing device, a second verification that the first client computing device received a Short Message Service (SMS) code.

7. The method of claim 1, wherein the notification that the second client computing device is authentically tied to the phone number is received in response to:
   receiving, from the second client computing device, a first verification that a Subscriber Identity Module (SIM) accessible to the second client computing device is associated with the phone number; and/or
   receiving, from the second client computing device, a second verification that the second client computing device received a Short Message Service (SMS) code.

8. A non-transitory computer readable storage medium configured to store instructions that, when executed by a processor included in a computing device, cause the computing device to manage phone number-based user accounts, by carrying out steps that include:
   receiving, from a first client computing device, a request to create a user account based on a phone number;
   authenticating that the first client computing device is associated with the phone number;
   creating the user account based on the phone numberl
   creating a hidden contact address based on the phone number, wherein the hidden contact address permits the first client computing device to access only a subset of services that otherwise are accessible using a counterpart visible contact address that is based on the phone number;
   assigning the hidden contact address to the user account; and
   in response to receiving a notification that a second client computing device is associated with the phone number:
   requiring the user account to be updated to be based on a different phone number, or assigning, to the user account, the counterpart visible contact address.

9. The non-transitory computer readable storage medium of claim 8, wherein requiring the user account to be based on the different phone number comprises:
   disassociating the phone number from the user account;
   associating the different phone number with the user account;
   creating a second hidden contact address based on the different phone number; and
   assigning the second hidden contact address to the user account.

10. The non-transitory computer readable storage medium of claim 8, wherein assigning the user account to the counterpart visible contact address comprises:
    creating the counterpart visible contact address based on the phone number; and
    assigning the counterpart visible contact address to the user account.

11. The non-transitory computer readable storage medium of claim 8, wherein the subset of services:
    includes client computing device recovery services and/or cloud sharing services, and
    excludes both messaging-based communication services and audio/video-based communication services.

12. The non-transitory computer readable storage medium of claim 8, wherein the counterpart visible contact address enables the first client computing device to access services that include one or more of:
    client computing device recovery services,
    cloud sharing services,
    messaging-based communication services, or
    audio/video-based communication services.

13. The non-transitory computer readable storage medium of claim 8, wherein authenticating that the first client computing device is tied to the phone number comprises:
    receiving, from the first client computing device, a first verification that a Subscriber Identity Module (SIM) accessible to the first client computing device is associated with the phone number; and/or
    receiving, from the first client computing device, a second verification that the first client computing device received a Short Message Service (SMS) code.

14. The non-transitory computer readable storage medium of claim 8, wherein the notification that the second client computing device is authentically tied to the phone number is received in response to:
    receiving, from the second client computing device, a first verification that a Subscriber Identity Module (SIM) accessible to the second client computing device is associated with the phone number; and/or
    receiving, from the second client computing device, a second verification that the second client computing device received a Short Message Service (SMS) code.

15. A computing device configured to manage phone number-based user accounts, the computing device comprising:
    at least one processor; and
    at least one memory; storing instructions that, when executed by the at least one processor, cause the computing device to carry out steps that include:
    receiving, from a first client computing device, a request to create a user account based on a phone number;

authenticating that the first client computing device is associated with the phone number;

creating the user account based on the phone number;

creating a hidden contact address based on the phone number, wherein the hidden contact address permits the first client computing device to access only a subset of services that otherwise are accessible using a counterpart visible contact address that is based on the phone number;

assigning the hidden contact address to the user account; and in response to receiving a notification that a second client computing device is associated with the phone number:
  requiring the user account to be updated to be based on a different phone number, or
    assigning, to the user account, the counterpart visible contact address.

16. The computing device of claim 15, wherein requiring the user account to be based on the different phone number comprises:

disassociating the phone number from the user account;

associating the different phone number with the user account;

creating a second hidden contact address based on the different phone number; and assigning the second hidden contact address to the user account.

17. The computing device of claim 15, wherein assigning the user account to the counterpart visible contact address comprises:

creating the counterpart visible contact address based on the phone number; and assigning the counterpart visible contact address to the user account.

18. The computing device of claim 15, wherein the subset of services:

includes client computing device recovery services and/or cloud sharing services, and excludes both messaging-based communication services and audio/video-based communication services.

19. The computing device of claim 15, wherein the counterpart visible contact address enables the first client computing device to access services that include one or more of:

client computing device recovery services, cloud sharing services, messaging-based communication services, or audio/video-based communication services.

20. The computing device of claim 15, wherein authenticating that the first client computing device is tied to the phone number comprises:

receiving, from the first client computing device, a first verification that a Subscriber Identity Module (SIM) accessible to the first client computing device is associated with the phone number; and/or receiving, from the first client computing device, a second verification that the first client computing device received a Short Message Service (SMS) code.

* * * * *

UNITED STATES PATENT AND TRADEMARK OFFICE
CERTIFICATE OF CORRECTION

PATENT NO. : 11,716,426 B2
APPLICATION NO. : 17/017560
DATED : August 1, 2023
INVENTOR(S) : Xudong Liu et al.

Page 1 of 1

It is certified that error appears in the above-identified patent and that said Letters Patent is hereby corrected as shown below:

In the Specification

At Column 8, Line 16: "media Messaging Service (MIMS) implemented by Mobile" should read -- media Messaging Service (MMS) implemented by Mobile --.

Signed and Sealed this
Twenty-first Day of November, 2023

Katherine Kelly Vidal
*Director of the United States Patent and Trademark Office*